US006944160B1

(12) United States Patent
Weiss et al.

(10) Patent No.: US 6,944,160 B1
(45) Date of Patent: Sep. 13, 2005

(54) METHOD AND APPARATUS FOR MULTIPLEXING VOICE OVER ATM OR IP DATA COMMUNICATION CHANNELS

(75) Inventors: Alan Weiss, Millburn, NJ (US); Wonho Yang, Lexington, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 900 days.

(21) Appl. No.: 09/663,009

(22) Filed: Sep. 15, 2000

(51) Int. Cl.[7] .............................................. H04L 12/00
(52) U.S. Cl. .............................. 370/395.1; 395/395.64; 395/412
(58) Field of Search ................. 370/229–235, 370/412–418, 395.1, 395.4–395.65, 464–465

(56) References Cited

U.S. PATENT DOCUMENTS 6,169,738 B1 * 1/2001 Sriram et al. .......... 370/395.21

6,445,696 B1 * 9/2002 Foodeei et al. ............. 370/356
6,519,259 B1 * 2/2003 Baker et al. ............. 370/395.4
6,574,193 B1 * 6/2003 Kinrot ........................ 370/229

OTHER PUBLICATIONS

Chambers et al, Voice over ATM, Bell Labs Technical Journal, pp. 176-191, 1998.*
Holler, Voice and telephony networking over ATM, Ericsson Review No. 1, pp. 40-45, 1998.*

* cited by examiner

Primary Examiner—Frank Duong (57) ABSTRACT

A method and apparatus for providing, illustratively, voice data over an asynchronous transfer mode (ATM), Internet Protocol (IP) or other communications network where the voice data is preferentially encoded at a high fidelity level, formed into transport cells or packets, and multiplexed onto a communications channel with, optionally, data traffic. In response to network congestion or buffer over utilization, the voice data is encoded at a medium or low fidelity level to reduce the amount of encoded data necessary to represent the voice data.

32 Claims, 5 Drawing Sheets

RETRO CODING EMBODIMENT
1/2

METHOD AND APPARATUS FOR MULTIPLEXING VOICE OVER ATM OR IP DATA COMMUNICATION CHANNELS

TECHNICAL FIELD

This invention relates to communications systems generally and, more particularly, to a method and apparatus for adaptively encoding and multiplexing audio data.

BACKGROUND OF THE INVENTION

Present techniques for incorporating audio data within existing network transport systems tend to provide high quality audio information at the expense of network capacity. For example, telecommunications networks typically utilize one digital signal level 1 (DS-1) signal path operating at 64 kilobits per second to transport one voice channel. While such voice data is of a relatively high quality or fidelity, the bandwidth or network capacity required to transport such voice data is relatively high.

Therefore, it is seen to be desirable to provide a method and apparatus that balances the competing requirements of high perceived speech quality, high capacity, moderate processing requirements and robust performance. More particularly, it is seen to be desirable to provide such voice data via a network transporting voice data and non-voice data.

SUMMARY OF THE INVENTION

The invention comprises a method and apparatus for providing, illustratively, voice data over an asynchronous transfer mode (ATM), Internet Protocol (IP) or other communications network where the voice data is preferentially encoded at a high fidelity level, formed into transport cells or packets, and multiplexed onto a communications channel with, optionally, data traffic. In response to network congestion or buffer over utilization, the voice data is encoded at a medium or low fidelity level to reduce the amount of encoded data necessary to represent the voice data.

In one embodiment of the invention a plurality of encoders has associated with it a respective cell assembly buffer for forming the cells or packets and passing the ATM cells or packets to a transmit buffer. Each of the encoders is responsive to buffer utilization levels of the transmit buffer and the respective cell assembly buffer to adapt the voice encoding from a preferred high fidelity level to a medium fidelity level or even a low fidelity level.

BRIEF DESCRIPTION OF THE DRAWINGS

The teachings of the present invention can be readily understood by considering the following detailed description in conjunction with the accompanying drawing in which.

To facilitate understanding, identical reference numerals have been used, where possible, to designate identical elements that are common to the figures.

DETAILED DESCRIPTION OF THE INVENTION

The subject invention will be described within the context of the adaptive encoding of a plurality of voice channels to form respective streams of asynchronous transfer mode (ATM) cells, internet protocol (IP) packets or other transport entities which are then multiplexed onto a communications link, such as a T1 link. It will be appreciated by those skilled in the art that different transport cell formats may be used, different communication links may be served, and different encoding techniques may be employed by those skilled in the art and informed by the present disclosure.

Figure 1:
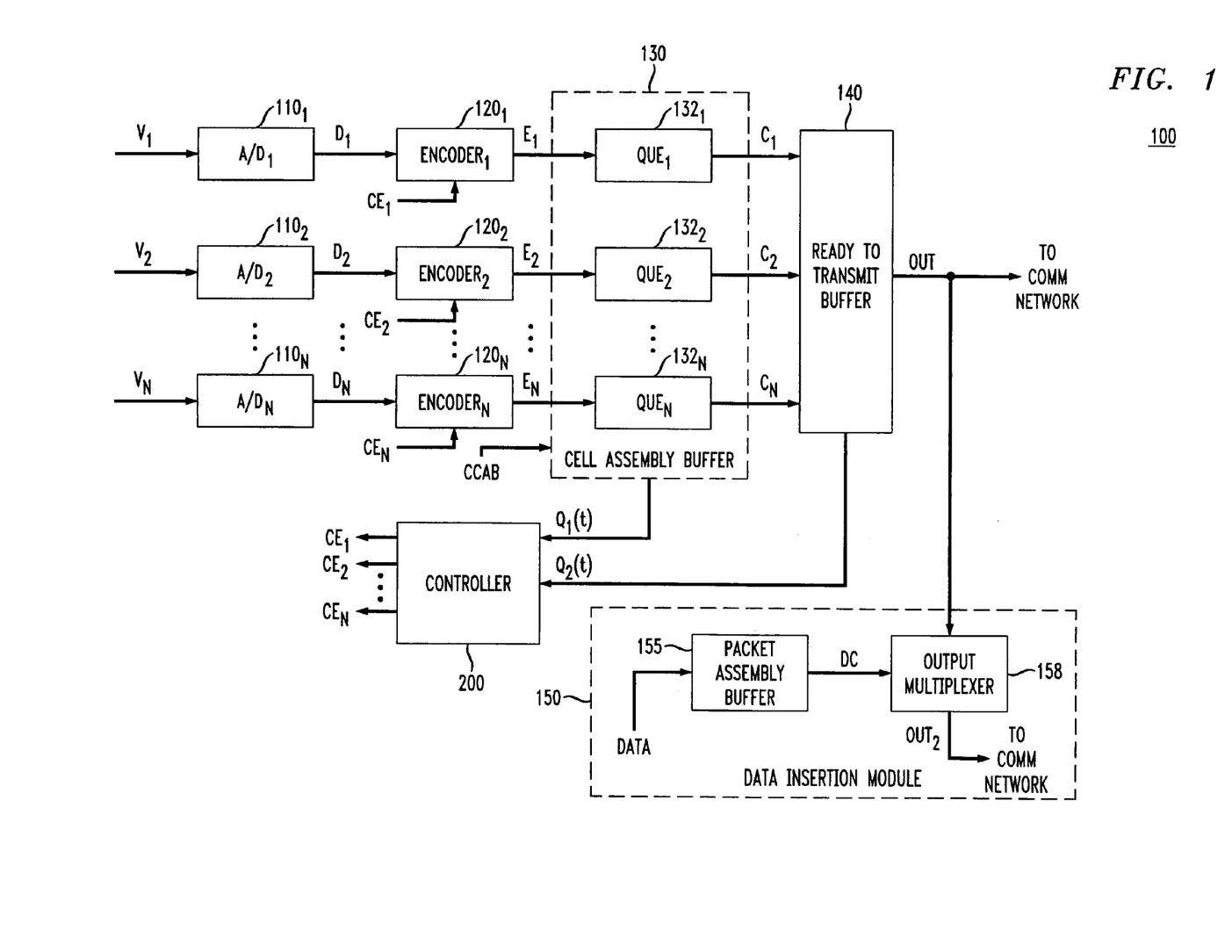
FIG. 1 depicts a high level block diagram of an audio encoding and multiplexing system including the present invention.

FIG. 1 depicts a high level block diagram of an audio encoding and multiplexing system including the present invention. Specifically, each of a plurality of voice channels $V_1$ through $V_N$ (collectively voice channels V) is coupled to a respective analog-to-digital (A/D) converter $110_1$ through $110_N$ (collectively A/D converters 110). Each A/D converter 110 responsively provides a respective digitized voice signal $D_1$ through $D_N$ (collectively digitized voice signals D) to a respective encoder $120_1$ through $120_N$ (collectively encoders 120). Each encoder 120 encodes its respective digitized voice signal D to produce a respective encoded output signal $E_1$ through $E_N$ (collectively encoded output signals E). Each encoded output signal E is coupled to a respective cell assembly buffer queue $132_1$ through $132_N$ (collectively cell assembly buffer queues 132). Together, the cell assembly buffer queues 132 form the cell assembly buffer 130. Each cell assembly buffer queue 132 provides at an output a respective formed cell or packet $C_1$ through $C_N$ (collected formed cells C). Each of the formed cells C is coupled to a ready to transmit buffer 140. It should be noted that the formed cells C may comprise ATM cells, IP packets or other transport entities.

In the system 100 of FIG. 1, a quantity $Q_1(t)$ provided by the cell assembly buffer 130 represents the utilization level or total amount of information (bits or fractional cells) in the cell assembly buffer 130 at time t. A quantity $Q_2(t)$ provided by the ready to transmit buffer 140 represents the utilization level or total amount of information in the ready to transmit buffer at the time t. Cells are formed by encoding the voice data streams and assembling cells or packets including encoded voice data (as described below). When a cell or packet is completely assembled, it is "popped" into the ready to transmit buffer 140. The cells or packets are normally served or "popped" in a FIFO fashion. If two or more cells are served simultaneously, the served cells may be ordered randomly, sequentially, or in a predetermined pseudo-random arrangement in the buffer. The ready to transmit buffer 140 transmits the stored cells or packets at a rate of, illustratively, 1.536 Mbps in the case of the communications network comprising a T1 link. In the case of the communications network comprising a different type of link, other data rates are, of course, utilized. Header insertion may be done when the product is popped, or at any other time prior to transmission.

In the system 100 of FIG. 1, each of the A/D converters 110 generates voice samples at a rate of 8,000 samples per second (i.e., 8 kHz). The 8 kHz sample rate is selected to conform to the normal bandwidth utilization in the existing telecom voice networks, where voice information up to a frequency of approximately 4 kHz may be carried. In the case of higher quality voice data, higher sampling rates for the A/D converters may be used. Each sample comprises 4 bits; namely, 2 high-priority bits, 1 medium-priority bit, and 1 low-priority bit. The 2 high-priority bits are necessary to reconstruct the sample and comprise the two most significant bits of the 4 bit sample. The next significant bit comprises the medium priority bit, while the least significant bit comprises the low-priority bit. The 4 bits are passed from each A/D converter 110 to the corresponding encoder 120.

Each encoder 120 encodes the respective digitized voice samples D at, illustratively, three fidelity levels; namely, high fidelity, medium fidelity, and low fidelity. For purposes of this discussion, assuming 4 bit samples at 8 kHz from the A/D converters 110, high fidelity encoding comprises 32 Kbps encoding, medium fidelity encoding comprises 24 Kbps encoding, and low fidelity encoding comprises 16 Kbps encoding. This encoding is performed by simply taking all 4 bits of each sample (high fidelity encoding), the three most significant bits of each sample (medium fidelity encoding) or just the two most significant bits of each sample (low fidelity encoding). Thus, encoders 120 cause a "loss" in audio fidelity by deliberately deleting one or more of the least significant bits of the digitized voice stream D.

The encoders 120 may delete bits, or cause fidelity loss, in response to the control signal CE produced by the controller 200 or, in the case of the encoder including the internal control logic, in response to a control signal indicative of network congestion, such as an over utilized cell assembly buffer 130 or an over utilized ready to transmit buffer 140. It is noted that a voice connection is perceived to be of high quality using 32 Kbps encoding, good quality at 24 Kbps encoding, but noticeably degraded and marginal at 16 Kbps encoding quality.

With respect to the cell assembly buffer 130, each of the N queues 132 accepts samples from a respective encoder 120. Each cell or packet that is assembled includes a fixed overhead used for signaling the coding rate provided in that cell. That is, for each cell or packet (or, optionally, groups of packets), a fixed overhead of between 0 and 4 bytes is included to identify the coding rate used such that a foreign decoder may appropriately decode the voice data. A 4 byte header is used in the ATM Adaptation Layer 2 (AAL2) standard defined and thee International Telecommunications Union-Telecommunication (ITU-TM) Standard i.363.2, which describe ATM Adaptation used for variable-byte-rate voice-over-ATM services. However, it is noted by the inventor that 4 bytes of overhead is unduly wasteful within the context of the present invention since, in the case of three fidelity levels of encoding, a 2 bit representation can signal which of the three encoding levels has been selected.

In the preferred embodiment of the invention, after each queue has accepted 48, 47 or 44 bytes worth of information (depending on overhead), the queue immediately provides the completed cell or packet to the ready to transmit buffer 140. At the same time, a 5 byte header is appended (in the case of ATM cells) to each cell so that the ready to transmit buffer receives 53 bytes at a time. It is noted that standard ATM cells provide 48 payload bytes and 5 header bytes, resulting in, typically, 53 bytes per cell. For IP cells (i.e., IP packets), header sizes may be adapted to suit any system requirements, as known to those skilled in the art. Therefore, the number of bytes appended or used for cells comprising IP packets may vary.

In one embodiment of the invention, the encoders 120 utilize silent suppression algorithms to determine whether or not data should be transmitted to respective cell assembly buffer queues. In this embodiment of the invention, the encoder 120 only transmits data to the respective cell assembly buffer queue 132 after a predetermined period of silence has elapsed or non-silence data has been received.

The system 100 of FIG. 1 includes a controller 200 for executing methods according to the invention. Specifically, the controller 200 executes methods which will be described in more detail below with respect to FIGS. 3 and 4 for modifying encoder operation and/or cell assembly buffer operation in response to network congestion or other factors. Briefly, the controller 200 receives control signals indicative of the amount of data within the cell assembly buffer 130 and the ready to transmit buffer 140. In response to these control signals, the controller 200 modifies the operation of the encoder 120 and/or the cell assembly buffer 130 to reduce the amount of data representing the respective voice channels such that communication path congestion is reduced. Such adaptation necessarily results in a reduced fidelity of the representation of the voice data $V_1$ through $V_N$ within the system. Specifically, the voice data $V_1$ through $V_N$ is encoded and provided to the communications network in one of a low fidelity, medium fidelity or high fidelity representation. The high fidelity representation of the voice data is preferred and normally provided to the communications network. In the event of communication channel congestion or buffer over utilization, the fidelity level of one or more voice channels is responsively reduced such that at least a low fidelity representation of each voice channel is provided. The operation of the controller 200 will be discussed in more detail below with respect to FIGS. 2–4.

In one embodiment of the invention, the voice data channels $V_1$ through $V_N$ are multiplexed with a DATA channel. In this embodiment of the invention, the system 100 of FIG. 1 includes a packet assembly buffer 155 that receives a data signal DATA, illustratively an 8 Mbps data channel. The assembled cells, IP packets or other transport entities are provided by the packet assembly buffer 155 to an output multiplexer 158 via the signal path DC. The output multiplexer 158 multiplexes the output of the packet assembly buffer 155 and the ready to transmit buffer 140 to form an output stream OUT2 that is coupled to the communications network. It is noted that the output multiplexer 158 operates in a weighted round robin fashion, thereby insuring at least a minimum level of quality of service (QOS) for the voice or audio data provided by the ready to transmit buffer 140. Thus, the second cell assembly buffer 155 and output multiplexer 158 form a data insertion module 150 providing for multiplexed data and voice over a communication channel using DTM, IP or other transport entities.

Figure 2:
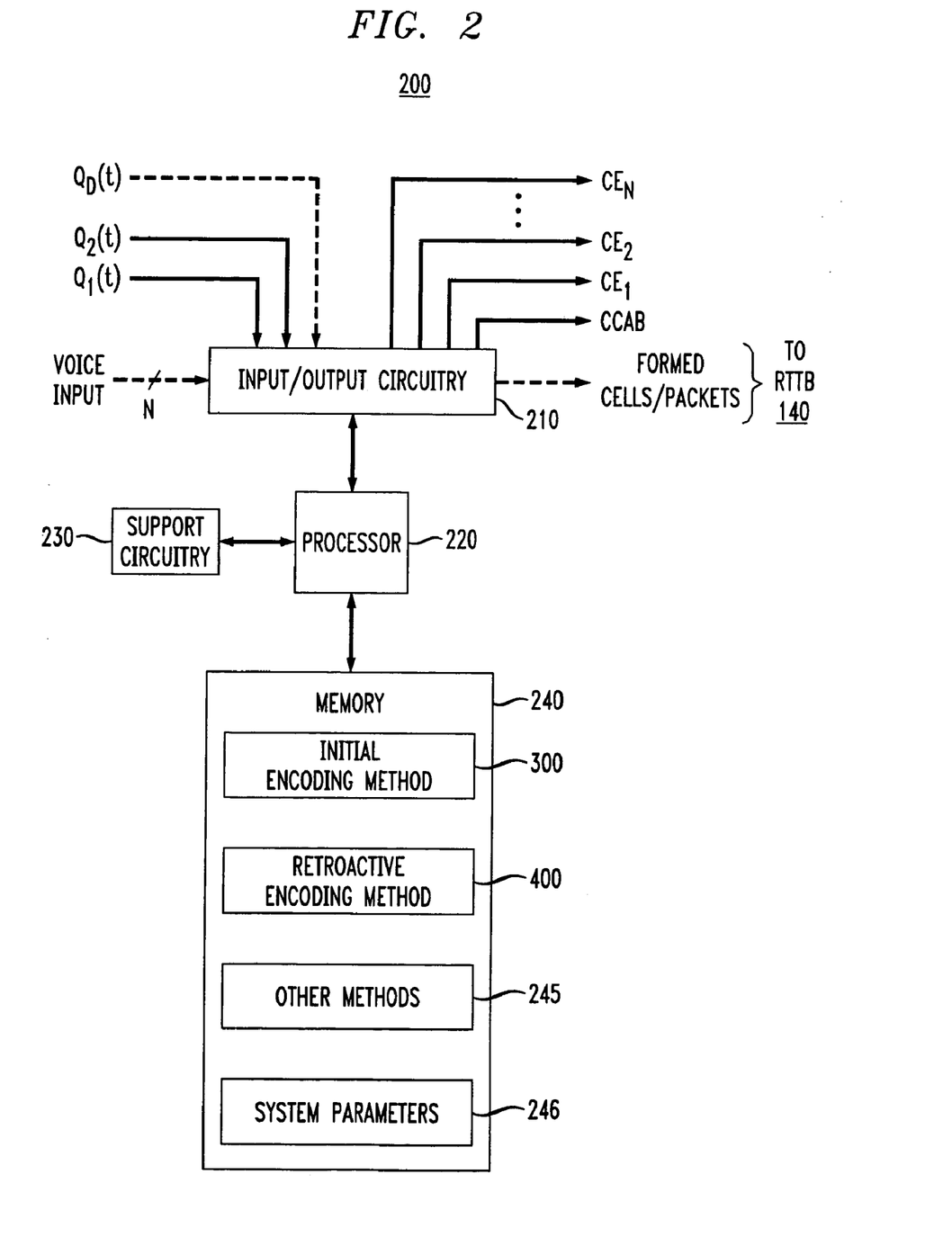
FIG. 2 depicts a high level block diagram of a controller suitable for use in the system of FIG. 1.

FIG. 2 depicts a high level block diagram of a controller suitable for use in the system of FIG. 1. Specifically, FIG. 2 depicts a high level block diagram of a functional implementation of the multiple voice channel encoding system 100 of FIG. 1. It will be appreciated by those skilled in the art that the control functions depicted herein may be implemented by a dedicated controller, such as the controller 200 depicted above in FIG. 1, or by control functions embedded within the various functional elements (e.g., the encoders 120 and cell assembly buffer 130) of the system 100 of FIG. 1. Moreover, the functions of the encoders 120 and cell assembly buffers 130 of the system 100 of FIG. 1 may be optionally included within the controller 200. In this embodiment of the invention, the encoding and cell assembly functions for each voice channel are performed by the controller 200.

The controller 200 of FIG. 2 comprises a processor 220 as well as memory 240 for storing an initial encoding method 300, a retroactive encoding method 400, other programs and methods 245 and system parameters 246. The processor 220 cooperates with conventional support circuitry 230 such as power supplies, clock circuits, cache memory and the like as well as circuits that assist in executing the software methods. The processor 220 also cooperates with input/output (I/O) circuitry 210 to form an interface between the control functions implemented by the various methods and the functional elements of the system 100 of FIG. 1. Specifically, the controller 200 of FIG. 2 provides a plurality of output signals $CE_1$ through $CE_N$ (collectively control signals CE) which are used to control the operation of the encoders $120_1$ through $120_N$. Additionally, the controller 200 provides an output signal CAB that is used to control the operation of the cell assembly buffer 130.

The subject invention adapts the amount of data used to represent input voice data in response to buffer utilization levels and/or network congestion levels. The invention utilizes two watermarks, $B_1$ and $B_2$ to represent utilization or congestion levels beyond which the amount of data used to represent the voice inputs is reduced. Specifically, the effective coding rate of the voice data is reduced as the cell assembly buffer queues 132 and/or read to transmit buffer 140 are nearly full, as determined by the relationship between the watermarks and the buffer fullness indicators. As previously noted, a first quantity $Q_2(t)$ indicates the amount of data or utilization level of the ready to transmit buffer 140, while a second quantity $Q_1(t)$ represents the amount of data or utilization level of the cell assembly buffer 130. A total quantity $Q(t)$ is equal to $Q_1(t)+Q_2(t)$.

The present invention may use either or both of two coding methods, which will be described in more detail below with respect to FIGS. 2 and 3. Briefly, the first coding method is denoted herein as Initio coding and is described in more detail below with respect to FIG. 2. In this coding method, a decision is made with respect to coding fidelity prior to the assembly of a cell.

The other distinction between our coding algorithms was the question of when the coding rate for any particular cell would be decided. It seems natural to decide at the beginning of the assembly of each cell whether or not the queue length (as measured by either $Q(t)$ or $Q_2(t)$) is above a watermark. This control—deciding on the coding rate as the cell is initialized—is referred to as Initio coding. If $Q(t)<B_1$ (or $Q_2(t)<B_1$), then the cell is coded at 32 Kbps. If $B_1 \leq Q(t)<B_2$ (or $B_1 \leq Q_2(t)<B_2$), then the cell is coded at 24 Kbps. And if $Q(t) \geq B_2$ (or $Q_2(t) \geq B_2$), then the cell is coded at 16 Kbps. When the cell is filled (after 12, 16 or 24 ms, corresponding to cell assembly time for 32 Kbps, 24 Kbps, or 16 Kbps respectively) it is popped to the transmit queue.

There is another possible method of deciding, denoted herein as Retro coding. All cells can be initially coded at 32 Kbps, the full rate. Then, when they are filled and ready to be popped to the ready to transmit queue, the queue length can be checked. If $Q(t)<B_1$, then the cell immediately leaves the assembly buffer and joins the transmit buffer. If $B_1 \leq Q(t)$, then the low priority bits are dropped, and coding continues at 24 Kbps. When the cell is filled with high and medium priority bits (4 ms later), $Q(t)$ is checked again. If $Q(t)<B_2$ then the cell is popped to the transmit buffer. Otherwise, the medium priority bits are discarded and coding continues at 16 Kbps. When the cell is filled it is popped without further checking.

To summarize, Initio and Retro coding for both $Q_2(t)$-based control and $Q(t)$-based control. We simulated with three sets of watermark levels: $B_1=63$, $B_2=68$ cells out of $B=72$ cells, $B_1=54$, $B_2=65$ cells, and also $B_1=36$, $B_2=54$ cells (36 cells corresponds to 10 ms delay at 1.536 Mbps; 54 cells corresponds to 15 ms; 65 corresponds to 18 ms; 63 cells corresponds to 17.5 ms; and 68 cells corresponds to 19 ms). We simulated all these conditions assuming that there were 0, 1, or 4 bytes of overhead per cell.

The original design specification was that at least 95% of the coding would be done at 32 Kbps, and no more than 1% at 16 Kbps. There was also specified no more than 0.0001% loss rate. The proposed voice multiplexer has a buffer of capacity 20 ms (at 32 Kbps coding and 0 overhead). This was the largest delay that we thought would be acceptable, when combined with other sources of delay in the system. Now larger buffers obviously have lower loss than smaller ones. Also, the lower the watermark levels, the lower the loss, but lower watermark levels also lead to lower coding rates (less coding at 32 Kbps). So our objective is to take the highest watermark levels consistent with acceptable loss, and furthermore to understand the sensitivity of the performance of the system (coding rate, loss rate) with respect to the various designs (watermark levels, Initio vs. Retro coding, $Q(t)$ vs. $Q_2(t)$ feedback, overhead, and of course loading n).

Figure 3:
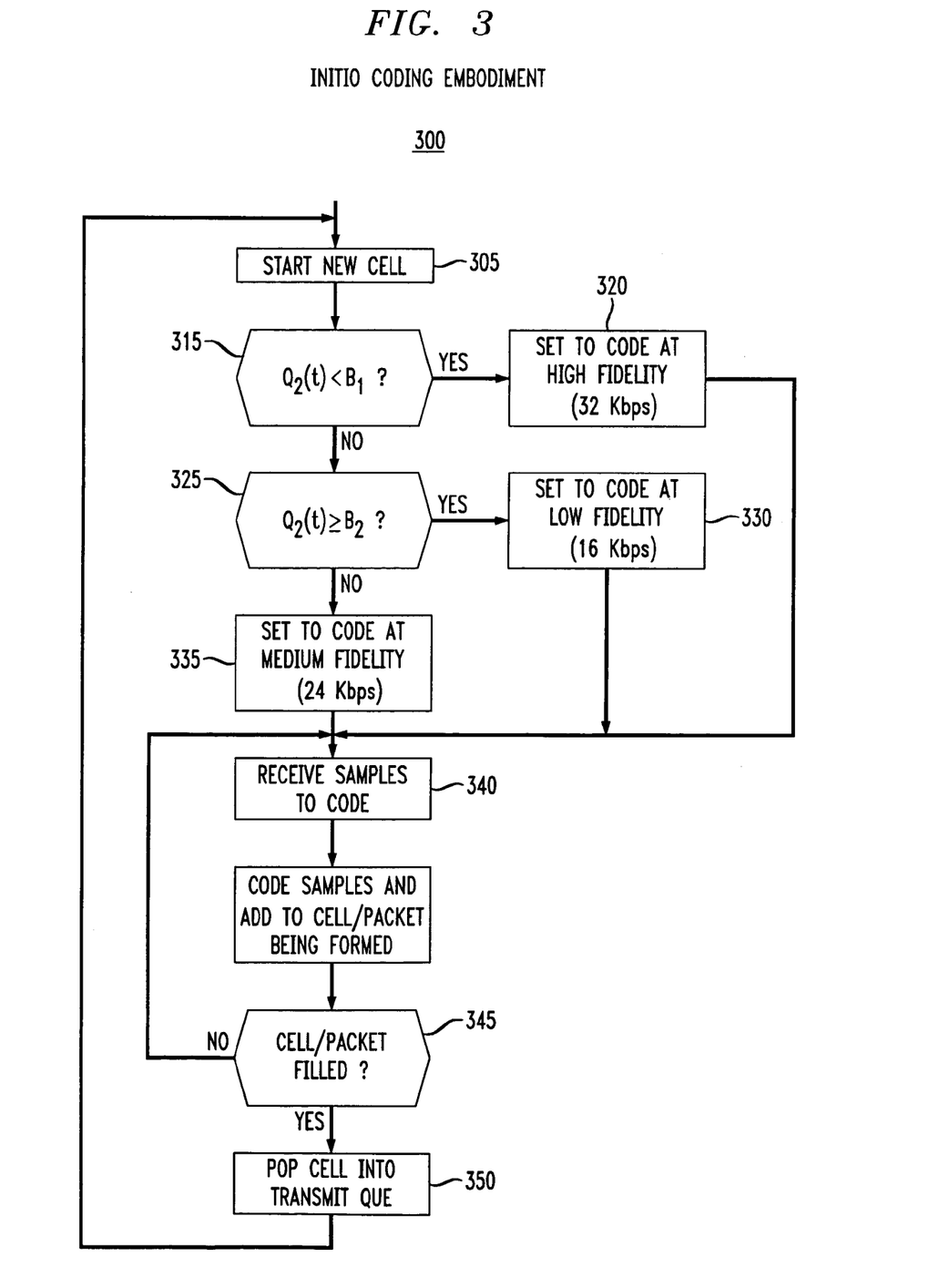
FIG. 3 depicts a flow diagram of a first method of encoding according to the present invention.

FIG. 3 depicts a flow diagram of a first method of encoding according to the present invention. Specifically, the method 300 of FIG. 3 describes the operation of an encoder 120 and corresponding cell assembly buffer 130 of a single voice channel. The method 300 of FIG. 3 operates to encode each voice sample at a level commensurate with the available bandwidth within the system. That is, the method 300 of FIG. 3 determines, prior to the formation of an ATM cell or IP packet whether the ATM cell or IP packet should include high, medium or low fidelity encoded voice data. As previously discussed with respect to FIG. 1, this determination is made based upon system congestion as indicated by the amount of data in the ready to transmit buffer 140 (i.e., $Q_2(t)$) and/or the amount of data in the respective cell assembly buffer 130 ($Q_1(t)$).

The method 300 of FIG. 3 is entered at step 305 when a new ATM cell or IP packet is to be formed within the cell assembly buffer 130. The method 300 then proceeds to step 315.

At step 315 a query is made as to whether the amount of data $Q_2(t)$ within the ready to transmit buffer 140 is less than a first watermark level $B_1$. If the query at step 315 is answered negatively, then the method 300 proceeds to step 325. If the query at step 315 is answered affirmatively, then the method 300 proceeds to step 320 where the coding mode is set at a high fidelity level, such as 32 Kbps. The method 300 then proceeds to step 340.

At step 325, a query is made as to whether the amount of data in the ready to transmit buffer 140 is greater than or equal to a second watermark level $B_2$. If the query at step 325 is answered negatively, then the method 300 proceeds to step 335 where the coding mode is set at a medium fidelity level, such as 24 Kbps. If the query at step 325 is answered affirmatively, the method 300 proceeds to step 330 where the coding mode is set at a low fidelity level, such as 16 Kbps. The method 300 proceeds to step 340.

At step 340, the encoder 120 receives a sample to be encoded from the A/D converter 110. As previously discussed, in the three fidelity level embodiment of the invention, the A/D converter 110 comprises a 4 bit A/D converter where the two most significant bits are necessary for a low fidelity encoding, the three most significant bits are necessary for a medium fidelity encoding and all four bits are necessary for a high fidelity encoding. The method 300 then proceeds to step 342.

At step 342, the sample is coded and added to an ATM cell or IP packet being formed within the cell assembly buffer 130. The method 300 then proceeds to step 345.

At step 345, a query is made as to whether the cell or packet being formed has been filled. That is, a query is made as to whether the payload portion of the ATM cell or IP packet being formed is filled such that additional coded samples may not be added. If the query at step 345 is answered negatively, then the method 300 proceeds to step 340 to receive the next sample to be coded. If the query at step 345 is answered affirmatively, then the method 300 to proceeds to step 350, where the cell or packet that has been filled is "popped" into the transmit queue. The method 300 then proceeds to step 305 where a new cell or packet is started.

The embodiment of the invention described above with respect to FIG. 3 envisions an encoding decision made prior to the formation of an ATM cell, IP packet, or other transport entity. In one embodiment of the invention, the ATM cell, IP packet or other transport entity is formed prior to the fidelity level decision. This embodiment of the invention is denoted as a retroactive coding embodiment and is found to be useful since the vast majority of encoding will occur at a high fidelity level. Thus, the processing required to determine whether system congestion is too high for a particular encoding level (e.g. steps 315 and 325) is avoided. The retroactive coding embodiment will now be described with respect to FIG. 4.

Figure 4A:
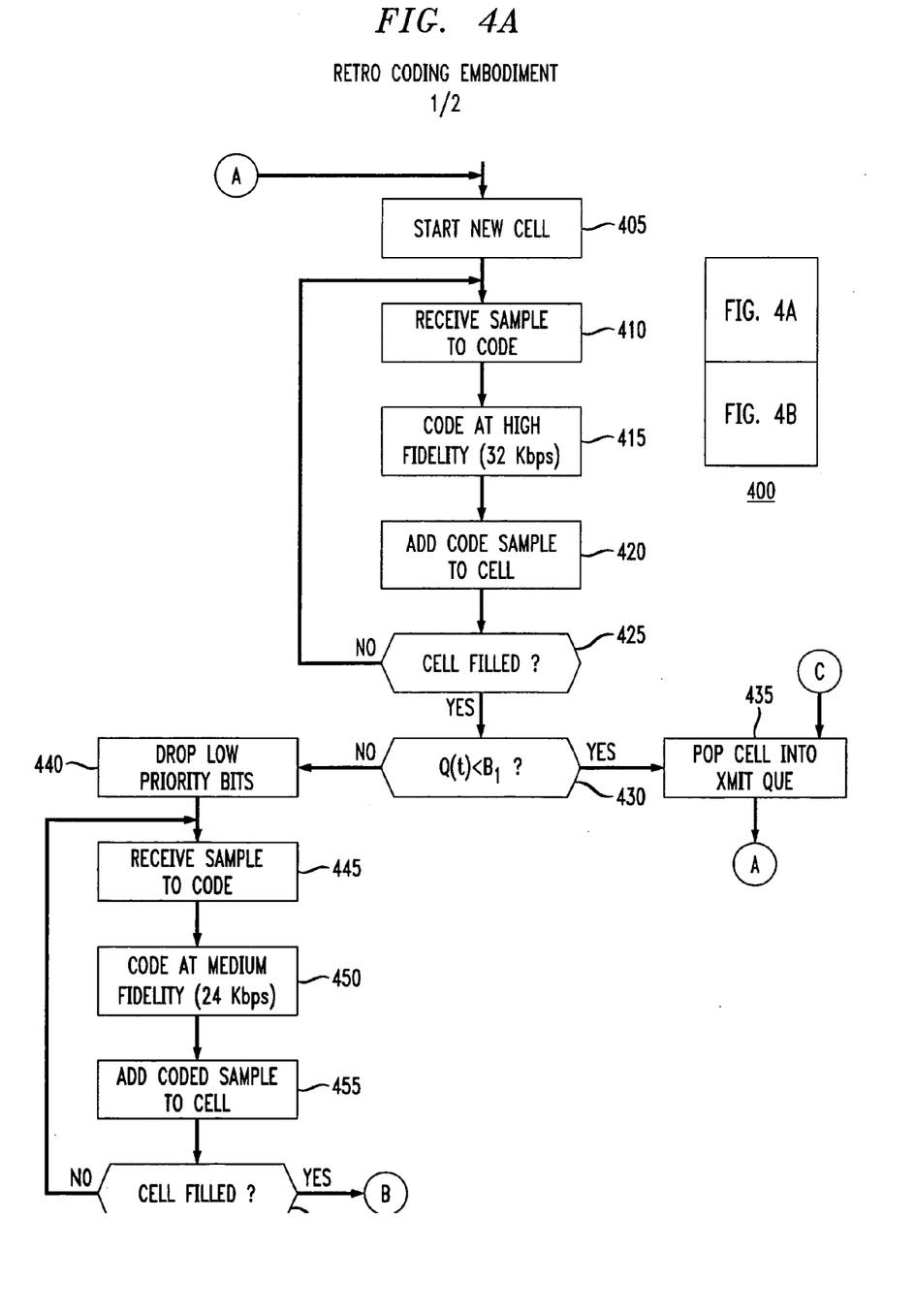
FIG. 4 depicts a flow diagram of a second method of encoding according to the present invention.
Figure 4B:
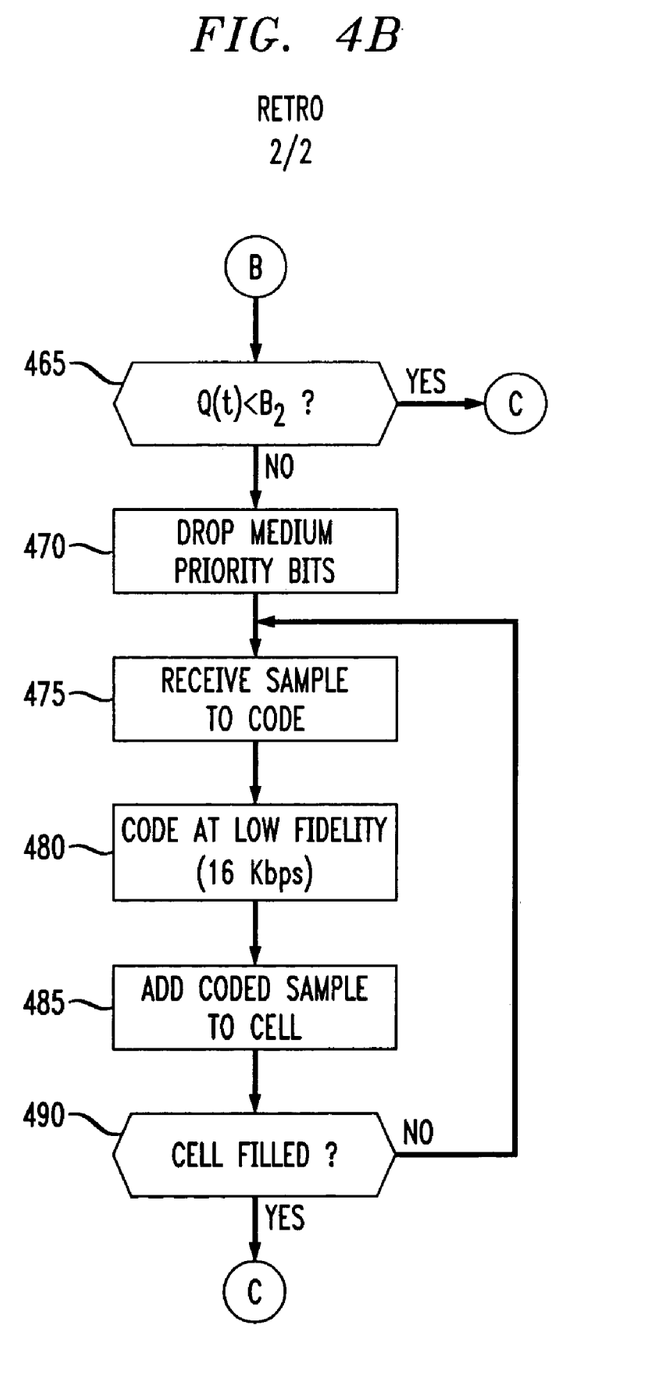

FIG. 4 depicts a flow diagram of a second method of encoding according to the present invention.

The method 400 of FIG. 4 is entered at step 405 when a new ATM cell, IP packet or other transport entity is started. The method 400 then proceeds to step 410. At step 410, a sample to be coded is received by the encoder 120 from the A/D converter 110. The method 400 then proceeds to step 415, where the received sample is coded at a high fidelity level (such as 32 Kbps) and to step 420 where the coded sample is added to the ATM cell, IP packet or other transport entity being formed. The method 400 then proceeds to step 425.

At step 425, a query is made as to whether the ATM cell, IP packet or other transport entity has been filled. If the query at step 425 is answered negatively, then the method 400 proceeds to step 410 where the next sample to be coded is received. If the query at step 425 is answered affirmatively, then the method 400 proceeds to step 430.

At step 430, a query is made as to whether the amount of data in the ready to transmit buffer 140 (i.e., $Q_2(t)$) is less than a first watermark level $B_1$ If the query at step 430 is answered affirmatively, then the method 400 proceeds to step 435 where the ATM cell, IP packet or other transport entity is popped into the transmit queue within the ready to transmit buffer 140, and to step 405 where a new cell is started. If the query at step 430 is answered negatively, then the method 400 proceeds to step 440.

At step 440, the low priority bits are dropped from the coded samples within the cell. That is, assuming that the A/D converters 110 comprise 4 bit A/D converters and that the encoders 120 utilize the layered coding algorithm technique described above (two high, one medium and one low priority bit), the low priority bit(s) are dropped, leaving samples effectively coded at a medium fidelity level. The method 400 then proceeds to step 445. At step 445, a sample to be coded is received by the encoder 120 from the A/D converter 110. The method 400 then proceeds to step 450, where the received sample is coded at a medium fidelity level (such as 24 Kbps) and to step 455 where the coded sample is added to the ATM cell, IP packet or other transport entity being formed. The method 400 then proceeds to step 460.

At step 460, a query is made as to whether the ATM cell, IP packet or other transport entity has been filled. If the query at step 460 is answered negatively, then the method 400 proceeds to step 445 where the next sample to be coded is received. If the query at step 460 is answered affirmatively, then the method 400 proceeds to step 465.

At step 465, a query is made as to whether the amount of data in the ready to transmit buffer 140 (i.e., $Q_2(t)$) is less than a second watermark level $B_2$. If the query at step 465 is answered affirmatively, then the method 400 proceeds to step 435, where the ATM cell, IP packet or other transport entity is popped into the transmit queue within the ready to transmit buffer 140, and to step 405 where a new cell is started. If the query at step 465 is answered negatively, then the method 400 proceeds to step 470.

At step 470, the medium priority bits are dropped from the coded samples within the cell. That is, assuming that the A/D converters 110 comprise 4 bit A/D converters and that the encoders 120 utilize the layered coding technique described above (two high, one medium and one low priority bit), the medium priority bit(s) are dropped, leaving samples effectively coded at a low fidelity level. The method 400 then proceeds to step 475.

At step 475, a sample to be coded is received by the encoder 120 from the A/D converter 110. The method 400 then proceeds to step 480, where the received sample is coded at a low fidelity level (such as 16 Kbps) and to step 485 where the coded sample is added to the ATM cell, IP packet or other transport entity being formed. The method 400 then proceeds to step 490.

At step 490, a query is made as to whether the ATM cell, IP packet or other transport entity has been filled. If the query at step 490 is answered negatively, then the method 400 proceeds to step 475, where the next sample to be coded is received. If the query at step 490 is answered affirmatively, then the method 400 proceeds to step 435.

The methods described above with respect to FIGS. 3 and 4 depict the representation of audio data in a layered fashion where the 4 bit representation includes two high priority, one medium priority and one low priority bit. Low fidelity, medium fidelity and high fidelity coding of the samples is achieved by removing both the low and medium fidelity bits, only the low fidelity bits or none of the bits, respectively. It will be appreciated by those skilled in the art that more fidelity levels may be provided within the system by utilizing an A/D converter having more bits or by other coding techniques.

Per the interview with the inventor, the invention is disclosed within the context of voice over ATM. However, the invention is equally applicable, in fact more applicable, to voice over internet protocol (IP). The invention is also described within the context of a T1 or fractional T1 communication link. The preferred use of the invention is within the context of a T1 or fractional T1 since as the data rate of the communications channel decreases the usefulness of the invention also tends to decrease. The invention uses adaptive digital pulse code modulation (ADPCM), however, other encoding techniques may also be used.

In one embodiment of the invention, the A/D converters 110 of FIG. 1 comprise 5 bit A/D converters. In this embodiment of the invention, in addition to high, medium and low fidelity encoding, a very high level of encoding is also provided. That is, in the above-described embodiment of the invention, high, medium and low fidelity encoding comprise 32 Kbps, 32 Kbps and 16 Kbps encoding, respectively. In the 5 bit A/D converter embodiment, a very high fidelity encoding level of 40 Kbps is also used. It will be appreciated by those skilled in the art that the watermark levels B and buffer utilization levels Q(t) are adapted to accommodate four levels of encoding rather than three levels of encoding. Such adaptation may occur in the initial encoding embodiment of FIG. 3 or the retroactive encoding embodiment of FIG. 4.

In one embodiment of the invention, a T1 line having a data rate of 1.536 Mbps was supplied via the system 100 of FIG. 1 using a first watermark level $B_1$ set at 63 cells and a second watermark level $B_2$ set at 68 cells (out of 72 cells).

In operation, the system 100 of FIG. 1 so configured met a design specification wherein at least 95% of the voice coding would be done at 32 Kbps, while no more than 1% of the voice coding would be done at 16 Kbps. Moreover, a specified loss rate of less than 0.0001% was achieved. In this embodiment of the invention, the voice multiplexer utilized a buffer having a capacity of 20 milliseconds (assuming a 32 Kbps coding and 0 bytes of overhead per cell). It will be appreciated by those skilled in the art, and informed by the teachings of the present invention, that lowering the watermark levels will lower loss but at the expense of requiring lower coding rates for more of the voice data. It is noted that the Retro coding scheme described above with respect to FIG. 4 typically experiences less loss and less coding at 16 Kbps. Thus, the Retro coding scheme is typically preferable to the initial coding scheme.

In experiments conducted by the inventor, it was determined that a 20 millisecond delay within the transmit buffer provided a maximum amount of delay for a subjectively "good" quality of service (QOS).

Improved QOS may be provided by reducing the transmit buffer delay, while reduced QOS may be provided by increasing the transmit buffer delay. At T1 data rates, a 20 millisecond delay represents approximately 72 cells worth of information. Thus, using the all buffers watermarking technique described above, a watermark level set at 54 equates to a 15 millisecond delay, while a watermark set at 65 cells equates to a 18 millisecond delay at T1 rates.

Although various embodiments which incorporate the teachings of the present invention have been shown and described in detail herein, those skilled in the art can readily devise many other varied embodiments that still incorporate these teachings.

What is claimed is:

1. An apparatus, comprising:
   a plurality of encoders for encoding respective sampled audio streams to produce respective encoded streams;
   a plurality of first buffers, for receiving respective encoded streams and forming therefrom respective sequences of transport cells, each of said transport cells comprising a portion of said respective encoded audio stream, each of said first buffers having associated with it a respective first buffer utilization level; and
   a second buffer, for receiving and forwarding to a communications channel said sequences of transport cells, said second buffer having associated with it a second buffer utilization level;
   wherein each of said encoders is operable for adapting an encoding fidelity level to produce said respective encoded streams comprising high, medium, and low priority bits, at least one of said low priority bits and said medium priority bits being removed from said transport cells in response to at least one of said respective first buffer utilization level and said second buffer utilization level being below at least one threshold utilization level.

2. The apparatus of claim 1, wherein said encoders provide high fidelity encoding in response to said second buffer utilization level being below a first threshold utilization level.

3. The apparatus of claim 1, wherein said encoders provide medium fidelity encoding in response to said second buffer utilization level being below a second threshold utilization level.

4. The apparatus of claim 3, wherein said high fidelity encoding comprises 32 kbps encoding and said medium fidelity encoding comprises 24 kbps encoding.

5. The apparatus of claim 3, wherein said high fidelity encoding comprises 48 kbps encoding and said medium fidelity encoding comprises 32 kbps encoding.

6. The apparatus of claim 3, wherein said encoders provide high fidelity encoding in response to said respective first buffer utilization level being below a third threshold utilization level.

7. The apparatus of claim 6, wherein said high fidelity encoding comprises 32 kbps encoding and said medium fidelity encoding comprises 24 kbps encoding.

8. The apparatus of claim 6, wherein said high fidelity encoding comprises 48 kbps encoding and said medium fidelity encoding comprises 32 kbps encoding.

9. The apparatus of claim 1, wherein said encoders provide high fidelity encoding to produce respective encoded streams including high, medium and low priority bits, said low and medium priority bits being removed from said transport cells in response to said second buffer utilization level being below a first threshold utilization level.

10. The apparatus of claim 1, wherein said encoders provide high fidelity encoding to produce respective encoded streams including high, medium and low priority bits, said low priority bits being removed from said transport cells in response to said second buffer utilization level being below a second threshold utilization level.

11. The apparatus of claim 9, wherein said low and medium priority bits are removed from transport cells within respective first buffers, said transport cells being further processed to include additional portions of said respective encoded stream.

12. The apparatus of claim 10, wherein said low priority bits are removed from transport cells within respective first buffers, said transport cells being further processed to include additional portions of said respective encoded stream.

13. The apparatus of claim 3 wherein said transport cells comprise asynchronous transfer mode (ATM) cells.

14. The apparatus of claim 3, wherein said communications channel comprises a T1 communication channel, said first threshold level comprises 54 cells and said second threshold level comprises 65 cells.

15. The apparatus of claim 3, wherein said cells comprise Internet Protocol (IP) packets.

16. An encoding method, comprising the steps of:
   encoding, using respective encoders, each of a plurality of sampled audio streams to produce respective encoded streams;
   storing each of said encoded streams in a respective first buffer, each of said first buffers having associated with it a respective first buffer utilization level;
   forming, for each of said stored encoded streams, a respective sequence of transport cells, each of said transport cells comprising a portion of said respective stored encoded stream;

coupling said formed transport cell sequences to a communications channel via a second buffer, said second buffer having associated with it a second buffer utilization level; and adapting an encoding fidelity level of each of said encoders to produce said respective encoded streams comprising high, medium, and low priority bits, at least one of said low priority bits and said medium priority bits being removed from said transport cells in response to at least one of said respective first buffer utilization level and said second buffer utilization level being below at least one threshold utilization level.

17. The method of claim 16, wherein said encoders provide high fidelity encoding in response to said second buffer utilization level being below a first threshold utilization level.

18. The method of claim 16, wherein said encoders provide medium fidelity encoding in response to said second buffer utilization level being below a second threshold utilization level.

19. The method of claim 18, wherein said high fidelity encoding comprises 32 kbps encoding and said medium fidelity encoding comprises 24 kbps encoding.

20. The method of claim 18, wherein said high fidelity encoding comprises 48 kbps encoding and said medium fidelity encoding comprises 32 kbps encoding.

21. The method of claim 18, wherein said high fidelity encoding comprises 24 kbps encoding and said medium fidelity encoding comprises 16 kbps encoding.

22. The method of claim 18, wherein said encoders provide high fidelity encoding in response to said respective first buffer utilization level being below a third threshold utilization level.

23. The method of claim 21, wherein said high fidelity encoding comprises 32 kbps encoding and said medium fidelity encoding comprises 24 kbps encoding.

24. The method of claim 21, wherein said high fidelity encoding comprises 48 kbps encoding and said medium fidelity encoding comprises 32 kbps encoding.

25. The method of claim 16, wherein said encoders provide high fidelity encoding to produce respective encoded streams including high, medium and low priority bits, said low and medium priority bits being removed from said transport cells in response to said second buffer utilization level being below a first threshold utilization level.

26. The method of claim 16, wherein said encoders provide high fidelity encoding to produce respective encoded streams including high, medium and low priority bits, said low priority bits being removed from said transport cells in response to said second buffer utilization level being below a second threshold utilization level.

27. The method of claim 25, wherein said low and medium priority bits are removed from transport cells within respective first buffers, said transport cells being further processed to include additional portions of said respective encoded stream.

28. The method of claim 26, wherein said low priority bits are removed from transport cells within respective first buffers, said transport cells being further processed to include additional portions of said respective encoded stream.

29. The method of claim 16 wherein said transport cells comprise asynchronous transfer mode (ATM) cells.

30. The method of claim 26, wherein said communication channel comprises a T1 communication channel, said first threshold level comprises 54 cells and said second threshold level comprises 65 cells.

31. The method of claim 26, wherein said cells comprise Internet Protocol (IP) packets.

32. A computer readable medium storing a software program, that, when executed by a computer, causes the computer to perform a method comprising the steps of:

encoding, using respective encoders, each of a plurality of sampled audio streams to produce respective encoded streams; storing each of said encoded streams in a respective first buffer, each of said first buffers having associated with it a respective first buffer utilization level;

forming, for each of said stored encoded streams, a respective sequence of transport cells, each of said transport cells comprising a portion of said respective stored encoded stream;

coupling said formed transport cell sequences to a communications channel via a second buffer, said second buffer having associated with it a second buffer utilization level; and adapting an encoding fidelity level of each of said encoders to produce said respective encoded streams comprising high, medium, and low priority bits, at least one of said low priority bits and said medium priority bits being removed from said transport cells in response to at least one of said respective first buffer utilization level and said second buffer utilization level being below at least one threshold utilization level.

* * * * *